United States Patent Office.

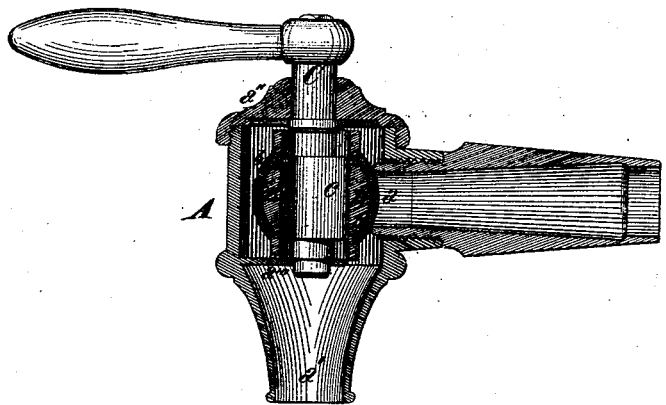
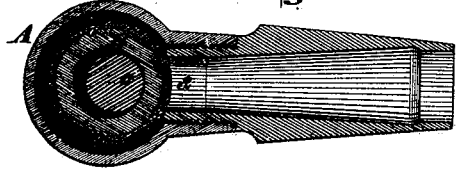
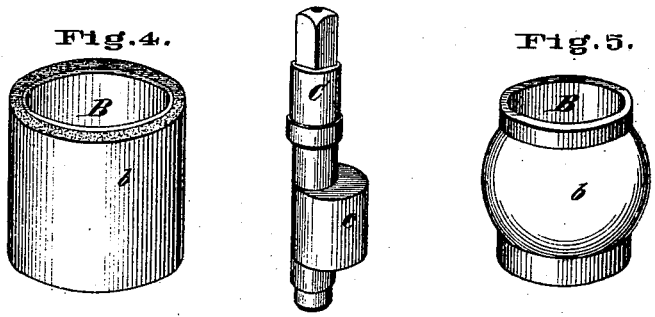

OSCAR HANKS, OF CINCINNATI, OHIO.

Letters Patent No. 109,730, dated November 29, 1870; antedated November 19, 1870.

IMPROVEMENT IN FAUCETS.

The Schedule referred to in these Letters Patent and making part of the same.

*To all whom it may concern:*

Be it known that I, OSCAR HANKS, of Cincinnati, Hamilton county, State of Ohio, have invented a certain new and useful Improvement in Faucets; and I do hereby declare the following to be a sufficiently full, clear, and exact description thereof to enable one skilled in the art to which my invention appertains to make and use it, reference being had to the accompanying drawing making part of this specification.

My invention consists of a faucet composed of three essential elements, viz., a shell, having an inlet, outlet, and valve-seat, a tubular revolving rubber-faced valve, either spherical or cylindrical on the outside, and a cam-handle for operating the valve.

In the accompanying drawing—

Figure 1 is a vertical section of a faucet embodying my invention.

Figure 2 is a sectional plan of the same.

Figure 3 is a perspective view of a cam-handle.

Figure 4 is a perspective view of the tubular revolving valve when made cylindrical on the outside.

Figure 5 is a perspective view of the tubular revolving valve when the same is made spherical on the outside.

A is the shell formed with the inlet-pipe $a$, outlet-pipe $a'$, and cap $a''$, the pipe $a$ projecting inside and forming the valve-seat in the manner shown.

B is the tubular revolving valve, which rests upon the shelf or diaphragm $a'''$ formed in the shell A.

The diaphragm $a'''$ is centrally perforated, for the reception of the cam-handle, and has a large opening formed in it for the passage of the fluid from pipe $a$.

The valve B is faced with rubber, $b$, either in the manner shown in figs. 1 and 5, or as shown in fig. 4. It is tubular, as shown, for the reception of the cam-handle, which is designed to work within it, and is at all times free to revolve, and by the frictional contact of the cam inside does revolve, presenting a new or different part of the periphery of the valve to the seat $a$ at each closing.

This revolving feature of the valve enables the rubber to wear uniformly and last a much greater length of time than if the rubber always seated in the same place.

C is the cam-handle, which is fitted into the cap $a''$ in the manner shown, and supported in the diaphragm $a'''$ in the bottom.

The cam $c$, in revolving within the valve B, forces the valve to and from the seat, to close and open the faucet, and also by frictional contact gives a rotary motion to the valve.

I claim herein as new, and of my invention—

The shell A $a$, tubular revolving-valves B $b$, and cam-handle C $c$, combined and operating substantially in the manner and for the purpose specified.

In testimony of which invention, I hereunto set my hand.

OSCAR HANKS.

Witnesses:
FRANK MILLWARD,
J. L. WARTMANN.